Aug. 15, 1961   F. J. VOGEL ET AL   2,996,664
CORONA DETECTOR
Filed Jan. 20, 1958

Inventors
Fred J. Vogel
Edward J. Adolphson
By Robert B. Benson
Attorney

United States Patent Office 2,996,664
Patented Aug. 15, 1961

2,996,664
CORONA DETECTOR
Fred J. Vogel and Edward J. Adolphson, Wauwatosa, Wis., assignors to Allis-Chalmers Manufacturing Company, Milwaukee, Wis.
Filed Jan. 20, 1958, Ser. No. 710,077
3 Claims. (Cl. 324—54)

This invention relates in general to devices for testing electrical apparatus. More specifically this invention relates to a device for detecting corona in electrical apparatus.

Corona is a localized breakdown of electrical insulation. Corona can occur when free electrons in the insulating medium are accelerated by an electric field to sufficient energy to produce ionization by collision with atoms of the insulation material. Electric fields occur in the region between any conductors which are at different potential and consequently exist in all electrical apparatus. The ionization which occurs produces heat and chemical changes which are usually injurious to the insulation. The ionization also produces a high frequency pulse of electrical energy in the conductors and radiates energy which may interfere with radio and television reception. Consequently, considerable effort is directed to developing electrical apparatus which are free of corona and to testing experimental and commercial apparatus to detect corona.

There are several methods for detecting the presence of corona in a test subject and for measuring the severity of the corona pulse. The presence of corona in an apparatus can be established by observing damage to the insulation of the apparatus. The presence of corona in an electrical apparatus may be detected as noise or light in the apparatus or a radio noise produced by the apparatus. A quantitive indication of corona may be obtained by displaying and measuring on an oscilloscope the pulse which occurs in the conductors of an apparatus which is producing corona.

When displaying a corona pulse wave on an oscilloscope it is desirable to separate the corona pulse from the operating current of the apparatus tested because otherwise the operating current would mask the smaller corona pulse on the oscilloscope. Known detectors for displaying corona pulse waves have included a filter which passes the high frequency corona pulse to the oscilloscope through a capacitor and bypasses the low frequency test current from the oscilloscope by means of a choke.

One method for testing electrical apparatus with such a detector of the prior art is to apply an alternating current of increasing voltage to the apparatus until corona is indicated by a high frequency disturbance at the peaks of the test wave. The corona pulse produces a deflection on the oscilloscope which is proportional to the voltage of the corona pulse. The detector can be calibrated by means of a known pulse so that this voltage can be read directly from the oscilloscope. The capacitance of the tested apparatus can be measured independently and the product of the capacitance of the corona pulse source and the voltage of the corona pulse is equal to the charge in coulombs of the corona. The charge in the corona pulse depends on the amount of ionization which takes place in the breakdown of the insulation and therefore is an indication of the severity of the corona.

One limitation of the detectors of the known prior art is that commercially available chokes for bypassing the operating current from the oscilloscope are generally made of small diameter wire and are not capable of carrying the normal operating current of apparatus such as transformers. Consequently, these detectors are usually limited to testing samples of insulation or to measuring the corona pulse voltage across an impedance such as a capacitor which may be connected in series with the apparatus tested. This test connection has the disadvantage that some of the corona pulse is diverted from the detector through the connecting impedance and consequently the sensitivity of the detector is reduced. Furthermore, such a division of the corona pulse makes quantitive measurements of corona more difficult and less accurate because allowance must be made for the part of the corona pulse which does not reach the detector. Another disadvantage of these detectors is that they do not distinguish between corona produced by the apparatus which is being tested and corona from other sources.

It would be advantageous for a corona detector to produce an oscilloscope display which could be read directly as coulombs of charge in order to avoid making computations for each observation. The voltage of a pulse of a given charge is inversely proportional to the capacitance of the apparatus tested. Consequently the sensitivity of a detector which indicates the corona pulse voltage rather than the charge varies inversely with the capacitance of the apparatus tested. Therefore, when testing apparatus having high capacitance, the results obtained from such a detector are not very reliable. On the other hand, since the charge is the product of the capacitance and the voltage, a charge indicating detector takes into account not only the small voltage of the corona pulse but also the offsetting high capacitance of such a test subject. Consequently in testing high capacitance apparatus a charge indicating detector reflects a larger quantity and therefore may be reliably used in such tests.

The new and improved corona detector of this invention has a transformer which is tuned so as to produce a series of oscillations directly indicating the charge in a corona pulse when the primary winding of this transformer is excited by the corona pulse. The oscillations which are produced are distinctive in appearance and last for a considerably longer time than the corona pulse itself so that the oscilloscope display is much more easily recognized. The transformer may be tuned to a frequency which will differentiate between a corona pulse occurring in the apparatus tested and a corona pulse from other sources. The primary winding of this transformer may easily be provided with sufficient current carrying capacity to be connected in series with apparatus which is being tested so that all of the corona pulse is received by the detector.

Therefore, it is an object of this invention to provide a new and improved detector for corona.

Another object of this invention is to provide a new and improved detector for corona in which the magnitude of the charge of the corona pulse may be observed directly on an oscilloscope.

Another object of this invention is to provide a new and improved detector for corona which may be used for testing apparatus with heavy currents.

Another object of this invention is to provide a new and improved detector for corona which may be used for testing apparatus of high capacitance.

Another object of this invention is to provide a new and improved detector for corona which produces a readily observable signal on an oscilloscope.

Another object of this invention is to provide a new and improved detector for corona which is less subject to interference than are detectors of the known prior art.

Other objects and advantages of this invention will be apparent from the following description when read in connection with the following drawing in which.

Figure 1:
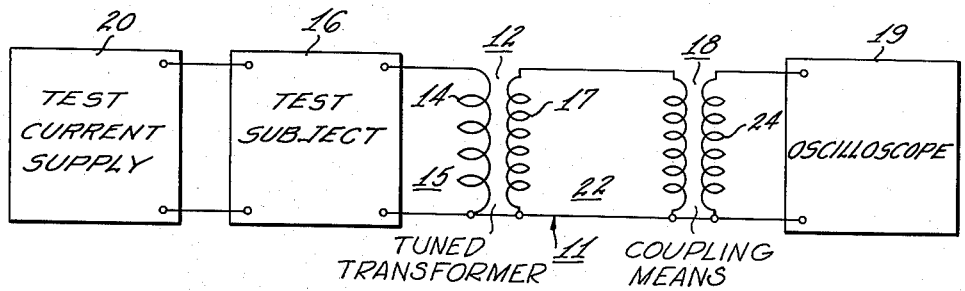
FIG. 1 is a diagrammatic showing of the preferred embodiment of the corona detector of this invention.

The detector 11 of this invention has a tuned transformer 12 which is preferably an air core transformer. As illustrated in FIG. 1, the primary winding 14 of the transformer 12 is adapted to be connected in a circuit 15 with a test subject 16 and the secondary winding 17 is connected, preferably through a coupling means 18, to an oscilloscope 19 for indicating the voltage in the secondary winding. The detector 11 may be connected to the test subject 16 in any suitable way, and the various connections are well known in the art. The test subject may be energized in any suitable manner such as by the separate current supply 20 as illustrated.

The primary winding 14 of the transformer 12 has only a few turns and consequently has a low inductance and a small capacitance and is resonant at a high frequency. Because of the low inductance and small capacitance of the primary winding 14, this winding has a short time constant; that is, the energy of the winding decays to zero in a short time. Because this winding has only a few turns, it can easily be provided with sufficient current carrying capacity to be connected in series with the test subject 16 so that the detector 11 receives all of the corona pulse which appears in the test subject. The secondary winding 17 has considerably more turns than the primary winding 14 and consequently the secondary circuit 22 including the secondary winding 17 and the coupling means 18 is resonant at a lower frequency than the primary winding. The natural frequency of the primary winding 14 and the secondary winding 17 of the transformer 12 is sufficiently higher than the frequency of the test current that only a slight indication of the test current appears in the secondary winding. However, when the primary winding 14 is excited by a high frequency pulse such as a corona pulse, a considerably higher voltge is produced in the secondary winding 17 than is produced by the test current, thereby permitting the corona pulse to be readily distinguished from the test wave (see FIG. 3). Furthermore, since the short time constant of the primary winding 14 causes the corona pulse in the primary winding to die out rapidly, the secondary winding 17 is allowed to resonate at its natural frequency after being excited by the corona pulse in the primary winding. Preferably the primary winding 14 has a sufficiently small time constant that the pulse in the primary winding decays to zero during the first quarter of the initial period of oscillation occurring in the secondary winding 17 so that the energy of the primary winding 14 does not interfere with the oscillations in the secondary winding 17 once the secondary winding oscillations have begun. Furthermore, it is desirable that the frequency of the primary winding 14 be sufficiently higher than the frequency of the secondary winding 17 so that the oscillations which are produced in the primary winding by the corona pulse do not significantly affect the lower frequency oscillations of the secondary winding.

Figure 3:
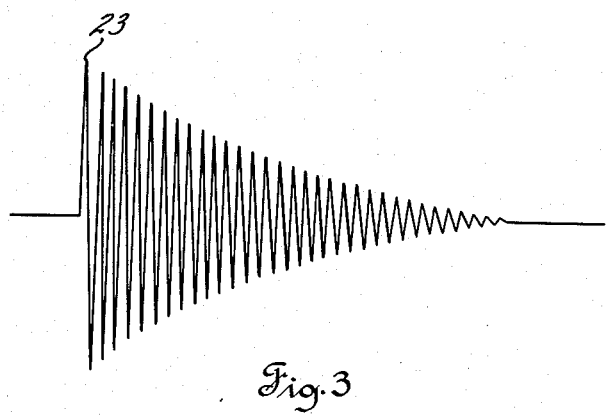
FIG. 3 illustrates a typical wave form produced by the detector in response to a corona pulse.

A wave form which may be produced on an oscilloscope by this detector is shown in FIG. 3. As illustrated the voltage in the secondary winding rises to an initial peak value 23 during the first quarter of the period of the wave. During the initial rise in voltage in the secondary winding 17, the energy of the corona pulse dies out in the primary winding 14. The secondary winding 17 then resonates at its natural frequency until the energy in the secondary winding is dissipated. The wave form may differ however. For example, the build-up to the peak voltage may be oscillatory if energy is fed back from other parts of the detector 11. However, the energy in the primary winding 14 is transferred to the secondary winding 17 during the first quarter of the period of the initial oscillation in the secondary winding as in the first example, and in either case the peak value 23 of the wave form indicates the magnitude of the charge of the corona pulse.

The train of oscillations that is produced in the secondary winding is much easier to distinguish on an oscilloscope than the corona pulse alone. For example, a corona pulse may be as short as one microsecond and a detector of the known prior art indicating only this pulse would produce a narrow deflection on an oscilloscope. The length of the output train of this detector varies with the frequency to which the secondary winding is tuned, but it is on the order of a few hundred microseconds. Hence this detector produces an oscilloscope display which is readily observable.

The voltage in the secondary winding of an air core transformer which is produced by a pulse in the primary winding is proportional to the charge in the pulse according to the expression (1)
$$E_2 = \frac{-E_1 C_1 M p^2}{(L_1 C_1 p^2 + C_1 R_1 p + 1)(L_2 C_2 p^2 + R_2 C_2 p + 1) - M^2 C_1 C_2 p^4}$$

where the subscripts 1 and 2 refer to the primary and secondary circuits respectively, C is capacitance, L is inductance, E is voltage, M is mutual inductance and $p$ represents the Heaviside operator which produces the damping and oscillatory terms in the solution. This analysis of an air core transformer is presented in several tests, for example at page 33 of Heaviside's Electric Circuit Theory by L. Cohen. From Expression 1 it appears that the charge in the corona pulse in the primary circuit, which is the product of the capacitance $C_1$ of the unit tested and the voltage $E_1$ of the corona pulse, is proportional to the voltage $E_2$ of the secondary winding. In detectors of the known prior art the corona pulse voltage $E_1$ could be obtained from the oscilloscope, but the capacitance $C_1$ of the tested unit had to be measured separately and the terms $E_1$ and $C_1$ multiplied to obtain the charge in the pulse. When the detector of this invention is calibrated by means of a known pulse to determine the oscilloscope deflection per coulomb of charge, $C_1 E_1$, the detector indicates charge directly without additional measurements or calculations. Combining the terms $C_1$ and $E_1$ to indicate charge as a function of the detector output voltage $E_2$ is a characteristic of the tuned transformer of this invention and such a result is not obtained in known prior art detectors which merely separate the corona pulse voltage $E_1$ from the voltage of the low frequency test wave. The terms $$Mp^2/(L_1 C_1 p^2 + C_1 R_1 p + 1)(L_2 C_2 p^2 + C_2 R_2 p + 1) - MC_1 C_2 p^4$$

in Expresion 1 determine the shape of the wave produced by the detector. Although these terms include the impedance of the device to be tested and are thus subject to change, the shape of the wave produced by a given charge, including the peak value 23, is substantially constant over the range of impedances which might be encountered in a corona test. The suitability of the detector for use with test subjects of differing impedances can be inferred from Expression 1 since the variable primary circuit terms are much smaller than the constant terms. This inference can be demonstrated by substituting typical circuit values in Expression 1 or by actually connecting various impedances across the primary winding 14 while delivering known pulses to the detector. On the other hand, with known prior art detectors in which the voltage $E_1$ and the capacitance $C_1$ were measured separately, the detector voltage is proportionately smaller for a given charge with test subjects of higher capacitance.

The secondary winding 17 may be tuned to any convenient frequency which allows the secondary winding to resonate when excited by the primary winding. Preferably a relatively high frequency is used in order to distinguish between corona in the tested apparatus and corona in other sources such as the test current supply lines. As the corona pulse travels through a conductor or is radiated, the high frequency components of the pulse die out more rapidly than do the low frequency components. A corona pulse which occurs within the test subject reaches the detector through a relatively low impedance and consequently retains a high portion of the high frequency components. However, a corona pulse which originates outside the test subject encounters a greater impedance because it must travel through longer conductors or be radiated to reach the detector. Consequently, the secondary winding is preferably tuned to a sufficiently high frequency so that it will not respond to the lower frequency corona pulses from sources other than the test subject.

Figure 2:
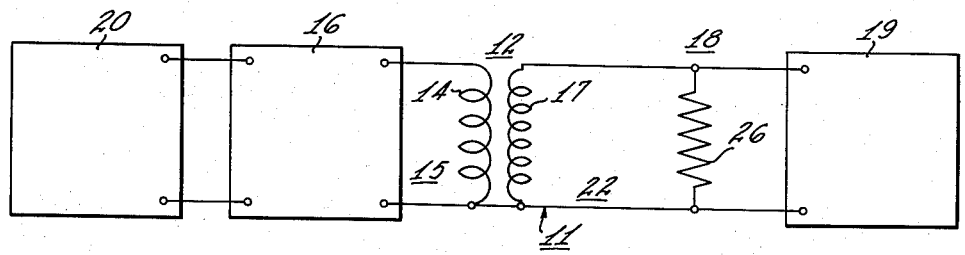
FIG. 2 is a diagrammatic showing of a second embodiment of the corona detector of this invention.

This detector may be coupled with an oscilloscope in any suitable manner. As illustrated in FIG. 1, the detector 11 is coupled with an oscilloscope 19 by means of a tuned radio frequency transformer 24. This coupling means has the advantage of providing a very sharp tuning of the detector which tends to reject corona and other disturbances from sources other than the test subject. As illustrated in FIG. 2, the detector 11 is coupled with an oscilloscope 19 by means of a resistor 26. This coupling device allows a broader tuning of the detector and accommodates small changes in the frequency of the secondary winding 17 which occur as the detector is used with apparatus of different impedances.

It may be desirable to provide amplification for the signal at various stages in the detector. Any suitable amplifying means may be used for this purpose.

It will be apparent to those skilled in the art that various changes and modifications may be made in the apparatus described without departing from the spirit or scope of the appended claims.

What is claimed is:

1. A detector for corona comprising a first winding adapted to receive a corona pulse, a second winding coupled with said first winding, said first winding having a time constant which is short relative to the natural period of oscillation of said second winding such that said second winding is allowed to oscillate at its natural frequency with a voltage that is a function of the charge in said pulse when excited by said corona pulse in said first winding, said second winding being coupled with means for indicating said voltage.

2. A detector for corona comprising a winding adapted to be connected with a test subject for carrying a low frequency wave for testing said subject and to receive a high frequency corona pulse from said test subject, a second winding inductively coupled with said first winding, said first winding and said second winding having natural frequencies sufficiently higher than the low frequency of said test wave for substantially eliminating said low frequency wave in said second circuit, said first winding having a time constant which is short relative to the natural period of oscillation of said second winding such that said second winding is allowed to oscillate at its natural frequency with a voltage that is a function of the charge in said corona pulse when excited by said pulse in said first winding, said second winding being coupled with an oscilloscope for indicating said voltage.

3. A detector for corona comprising a first winding adapted to be connected with a test subject and to receive a corona pulse originating in said test subject, a second winding inductively coupled with said first winding, said first winding having a time constant which is smaller than the natural period of oscillation of said second winding such that said second winding is allowed to oscillate at its natural frequency with a voltage that is a function of the charge in said pulse when excited by a corona pulse in said first winding and means including a transformer tuned to the frequency of said second winding for coupling said second winding with an oscilloscope for indicating said voltage.

References Cited in the file of this patent

UNITED STATES PATENTS

| | | |
|---|---|---|
| 2,525,413 | Johnson | Oct. 10, 1950 |
| 2,627,546 | Paine | Feb. 3, 1953 |
| 2,713,639 | Blackman | July 19, 1955 |
| 2,750,562 | Starr | June 12, 1956 |
| 2,802,180 | Nye | Aug. 6, 1957 |
| 2,883,616 | Sabaroff | Apr. 21, 1959 |

OTHER REFERENCES

Holcomb: "Electrical Engineering," July 1955; pages 573–577.

Adolphson, Vogel: "Electrical Engineering," September 1957; pages 782–786.

Dedication 2,996,664.—*Fred J. Vogel* and *Edward J. Adolphson*, Wauwatosa, Wis. CORONA DETECTOR. Patent dated Aug. 15, 1961. Dedication filed Jan. 28, 1977, by the assignee, *Allis-Chalmers Corporation*.

Hereby dedicates to the People of the United States, the entire remaining term of said patent.

[*Official Gazette March 29, 1977.*]